US009013464B2

(12) United States Patent
Parks et al.

(10) Patent No.: US 9,013,464 B2
(45) Date of Patent: Apr. 21, 2015

(54) LINKED SHELL

(71) Applicant: Microsoft Corporation, Redmond, WA (US)

(72) Inventors: Gregory H. Parks, Redmond, WA (US); Erik Michael Geidl, Moscow, ID (US); Andrew John Fuller, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/763,658

(22) Filed: Feb. 9, 2013

(65) Prior Publication Data

US 2013/0151874 A1 Jun. 13, 2013

Related U.S. Application Data

(63) Continuation of application No. 11/627,860, filed on Jan. 26, 2007, now Pat. No. 8,384,700.

(51) Int. Cl.
*G06F 3/038* (2013.01)
*G09G 5/00* (2006.01)
*G06F 1/26* (2006.01)
*G06F 1/32* (2006.01)

(52) U.S. Cl.
CPC .............. *G06F 1/266* (2013.01); *G06F 1/3293* (2013.01)

(58) Field of Classification Search
CPC ................................ G06F 1/266; G06F 1/3293
USPC ............................ 713/300, 320, 323; 345/211
See application file for complete search history.

(56) References Cited

U.S. PATENT DOCUMENTS

| 6,301,609 | B1 | 10/2001 | Aravamudan |
| 6,487,548 | B1 | 11/2002 | Leymann |
| 6,631,474 | B1 * | 10/2003 | Cai et al. ........................ 713/300 |
| 6,950,823 | B2 | 9/2005 | Amiri |
| 6,996,828 | B1 | 2/2006 | Kimura |

(Continued)

FOREIGN PATENT DOCUMENTS

| CN | 1734400 | 2/2006 |
| JP | 2005-521948 | 10/2003 |

(Continued)

OTHER PUBLICATIONS

KR Notice of Preliminary Rejection for Application No. 10-2009-7014854, Mar. 27, 2013.

(Continued)

*Primary Examiner* — Viet Pham
(74) *Attorney, Agent, or Firm* — John Jardine; Kate Drakos; Micky Minhas

(57) ABSTRACT

An apparatus and method is provided for controlling a display device for displaying a user interface associated with an application. A processor for controlling peripheral devices and/or the display may be selected based on characteristics of a requested function to be performed. For example, a processor may be selected with a power characteristic corresponding to a power level needed to perform the requested function. Also, an instantiation of a user interface may be switched based on selection of the processor for controlling peripheral devices. In another example, the transition from one instantiation of the user interface to another instantiation of the user interface may be smooth such that a user may be unaware a change has been made.

20 Claims, 10 Drawing Sheets

(56) References Cited

U.S. PATENT DOCUMENTS

| | | | |
|---|---|---|---|
| 7,158,969 B2 | 1/2007 | Dettinger | |
| 7,590,712 B2 | 9/2009 | Chambers et al. | 709/223 |
| 7,721,118 B1 | 5/2010 | Tamasi et al. | 713/300 |
| 7,805,425 B2 | 9/2010 | Cox | |
| 7,925,900 B2 | 4/2011 | Parks | |
| 7,933,888 B2 | 4/2011 | Cox | |
| 8,384,700 B2 | 2/2013 | Parks | |
| 2002/0095609 A1 | 7/2002 | Tokunaga | |
| 2003/0153354 A1 | 8/2003 | Cupps | |
| 2003/0188077 A1 | 10/2003 | Watts, Jr. | |
| 2004/0039742 A1 | 2/2004 | Barsness | |
| 2004/0177200 A1 | 9/2004 | Chu | 710/301 |
| 2004/0268166 A1 | 12/2004 | Farkas et al. | 713/320 |
| 2005/0066209 A1* | 3/2005 | Kee et al. | 713/323 |
| 2005/0132239 A1* | 6/2005 | Athas et al. | 713/300 |
| 2005/0165880 A1 | 7/2005 | Moody | |
| 2005/0215252 A1 | 9/2005 | Jung | |
| 2005/0216595 A1 | 9/2005 | Miyata | |
| 2005/0268072 A1 | 12/2005 | Najam | |
| 2005/0285864 A1* | 12/2005 | Diamond et al. | 345/520 |
| 2006/0047782 A1 | 3/2006 | Niemi | |
| 2006/0064473 A1 | 3/2006 | Borella | |
| 2006/0080130 A1 | 4/2006 | Choksi | |
| 2006/0095593 A1* | 5/2006 | Kranich | 710/4 |
| 2006/0129852 A1* | 6/2006 | Bonola et al. | 713/300 |
| 2006/0129861 A1 | 6/2006 | Kee et al. | 713/323 |
| 2006/0294401 A1* | 12/2006 | Munger | 713/300 |
| 2007/0094444 A1 | 4/2007 | Sutardja | 711/112 |
| 2007/0168336 A1 | 7/2007 | Ransil | |
| 2011/0154082 A1 | 6/2011 | Parks | |

FOREIGN PATENT DOCUMENTS

| | | |
|---|---|---|
| JP | 2003-323417 | 11/2003 |
| KR | 10-2003-0032571 | 4/2003 |

OTHER PUBLICATIONS

Search Report for Application No. PCT/US2007/089228, Mailed May 30, 2008.

EP extended European search report for Application No. 07870146.3-2224 / 2106579 PCT/US2007089228, Reference EP65844TE900kap, Jan. 3, 2013.

JP Notice of Rejection for Application No. 2009-547250, Aug. 3, 2012.

International Search Report from Application No. PCT/US2007/001978, May 23, 2007.

EP Search Report, Ref. EP60516TE900peu, for Application No. 07709834.1-2201 / 2024877 PCT/US2007001978, Nov. 30, 2009.

Acharya, Unleashing the Power of Wearable Devices in a SIP Infrastructure, Proceedings of the 3rd IEEE Int'l Conf. on Pervasive Computing and Communications (PerCom 2005).

Chinese Notice on the First Office Action, Application No. 200780015000.7, Date of Dispatch Oct. 8, 2010.

Communication pursuant to Article 94(3) EPC, Ref EP60516TE900peu, for Application No. 07709834.1-2201 / 2024877, date Jan. 29, 2010.

Second Office Action, The People's Republic of China, for Application No. 200780050380.8, Jul. 7, 2011.

EP Communication for Application No. 07870146.3-2224 / 2106579 PCT/US2007089228, Reference EP65844TE900kap, Jan. 3, 2013.

KR Notice of Preliminary Rejection for Application No. 10-2008-7025998, Mar. 13, 2013.

CN Notice on the First Office Action for Application No. 200780015000.7, Oct. 8, 2010.

CN Notice on the Second Office Action for Application No. 200780015000.7, Mar. 8, 2011.

EP Communication for Application No. 07709834.1-2201, Reference EP60516TE900peu, Dec. 2, 2010.

EP Communication for Application No. 07709834.1-2201, Reference EP60516TE900peu, May 25, 2011.

CN Notice on the First Office Action for Application No. 200780050380.8, Aug. 12, 2010.

CN Notice on the Second Office Action for Application No. 200780050380.8, Jul. 7, 2011.

JP Final Rejection for Application No. 2009-547250, Dec. 7, 2012.

Jones, "Solving the Form Factor Problem: The Polymorphic PC", Lifestyle mobile PCs for everyone, Mobile PC Business Unit, ThinkWeek, May 2006.

* cited by examiner

LINKED SHELL

RELATED APPLICATIONS

This application is a continuation of and claims benefit from U.S. patent application Ser. No. 11/627,860, that was filed on Jan. 26, 2007, and that is incorporated herein by reference in its entirety.

BACKGROUND

Portable electronic computing devices have become vastly popular. Many functions may be performed on these devices. However, these functions require power to perform. Power is typically provided by portable means such as a battery that becomes depleted of energy over time. In this case, the battery needs to be recharged or replaced prior to continued use of the device. The lifespan of the battery depends in most part on the degree of use of the device and/or the functions performed on the device. Some functions require more power than other functions. Therefore, depending on which functions are performed at a given frequency, the battery, may need to be recharged very frequently.

When the battery needs to be recharged or replaced frequently, the user of the device may become frustrated. What is needed is an apparatus or system that can prolong the lifespan of a battery so that excessively frequent recharging of the battery is not needed.

Also, information pertaining to functions of the device is often displayed for a user. Such information may be displayed in a user interface on a display device. However, display of the user interface may be disrupted when attempting to prolong the lifespan of the battery. Therefore, a method or apparatus is needed in which power may be preserved in a portable device while preserving a look and feel of a user interface associated with an active application.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, an apparatus is provided including multiple processors. Any of the processors in the apparatus may function in any number of modes associated with a power consumption level. The apparatus may further include a switch and a display device connected to any of the processors.

In another example, a user interface may be displayed on the display device and control of peripheral devices and/or the display device may switch between different processors based on a power level or a power characteristic of a requested function. A corresponding switch in the display of the user interface may also occur in which the switch in the display of the user interface is substantially imperceptible to a user.

In another example, a method is provided for displaying a user interface on a display device of a computing device. The computing device may include multiple processors that may control peripheral devices. Selection of a processor to control the peripheral devices may depend on a power characteristic or power level of a requested function. Display of the user interface may also vary based on the selected processor controlling the peripheral devices. Changing a display of the user interface may be performed such that a user may be unaware a change has taken place.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
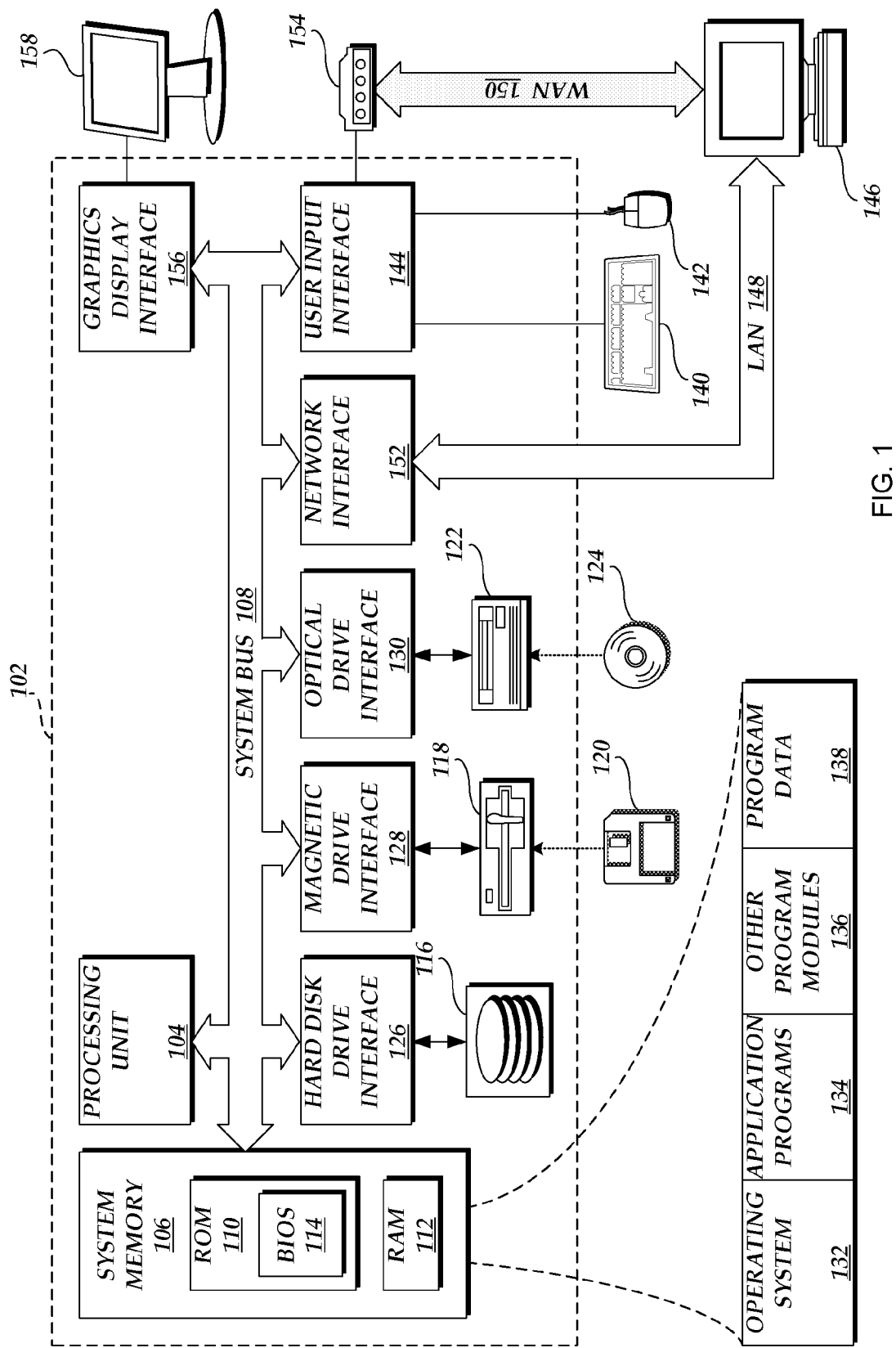
FIG. 1 illustrates an example of a computing system environment in which computing subsystems may provide processing functionality and user interfaces.

FIG. 1 illustrates an example of a suitable computing system environment 100 or architecture in which computing subsystems may provide processing functionality. The computing system environment 100 is only one example of a suitable computing environment and is not intended to suggest any limitation as to the scope of use or functionality of the invent on. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PO) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only. FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through an non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 146 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate a networked environment using logical connections to one or more remote computers, such as a remote computer. The remote computer lay be a personal computer, a server, a router, a network PC, a peer device or other common network node, and typically includes many or all of the elements described above relative to the computer 102. The logical connections depicted in FIG. 1 include a local area network (LAN) 148 and amide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

In one example, a hybrid computing device or apparatus is provided that may contain multiple processors. Any of the multiple processors may function at a different performance or power level and may provide any corresponding type of function. In one example, a first processor in the computing device may have an associated first power characteristic while a second processor in the computing device may have an associated second power characteristic. The power characteristics may indicate any power feature of the corresponding processor. For example, a power characteristic may indicate a maximum level of power that the corresponding processor may consume. In this example, a low power processor may have a power characteristic that indicates that the low power processor has a maximum level of power consumption of a certain predetermined amount. In this case, if a function to be performed requires a level of power that is greater than the certain predetermined amount (i.e., exceeds the power characteristic of the corresponding processor), then the corresponding processor may not perform the function. Hence, in this example, the power characteristic of a processor may be compared to a corresponding power characteristic of a desired function to be performed. Selection of a processor for controlling peripheral devices and/or display devices connected to the computing device may be based on the matching of power characteristics.

For example, a first processor in the apparatus may be a low power processor for controlling any number of peripheral devices. The peripheral device(s) may perform any number of low capacity functions under control of the low power processor. The low capacity functions may consume an amount of power that is less than a predetermined amount (e.g., a low power characteristic). Also, certain high capacity or high performance functions may be outside of the capabilities of the low power processor. In this case, such high capacity functions may not be controlled by the low power processor.

In this example, when a high capacity function is requested and the low power processor is controlling the peripheral device(s), the apparatus may switch control of the peripheral devices from the low power processor to another processor. The other processor may be a high capacity or high performance processor that is capable of performing the requested high capacity function. In this case, the high performance processor may control the peripheral devices such that the requested high capacity function may be performed. After the requested high capacity function is completed, another function may be requested. Any request may be received at the apparatus by a variety of methods. For example, a user may input a request for a function via a peripheral device to be performed by any peripheral device. Responsive to the request and the type of function requested, a corresponding processor may be activated to control the peripheral device(s) to perform the requested function. For example, if the requested function is a high capacity of performance function, a high performance processor may be selected or activated to control corresponding peripheral devices to perform the requested function. If the requested function is a low capacity or low performance function, a low power processor may be selected and activated to control the peripheral devices to perform the requested function. Also, less power may be consumed when a low power processor controls the peripheral devices as compared to a high performance process controlling the peripheral devices.

Figure 2:
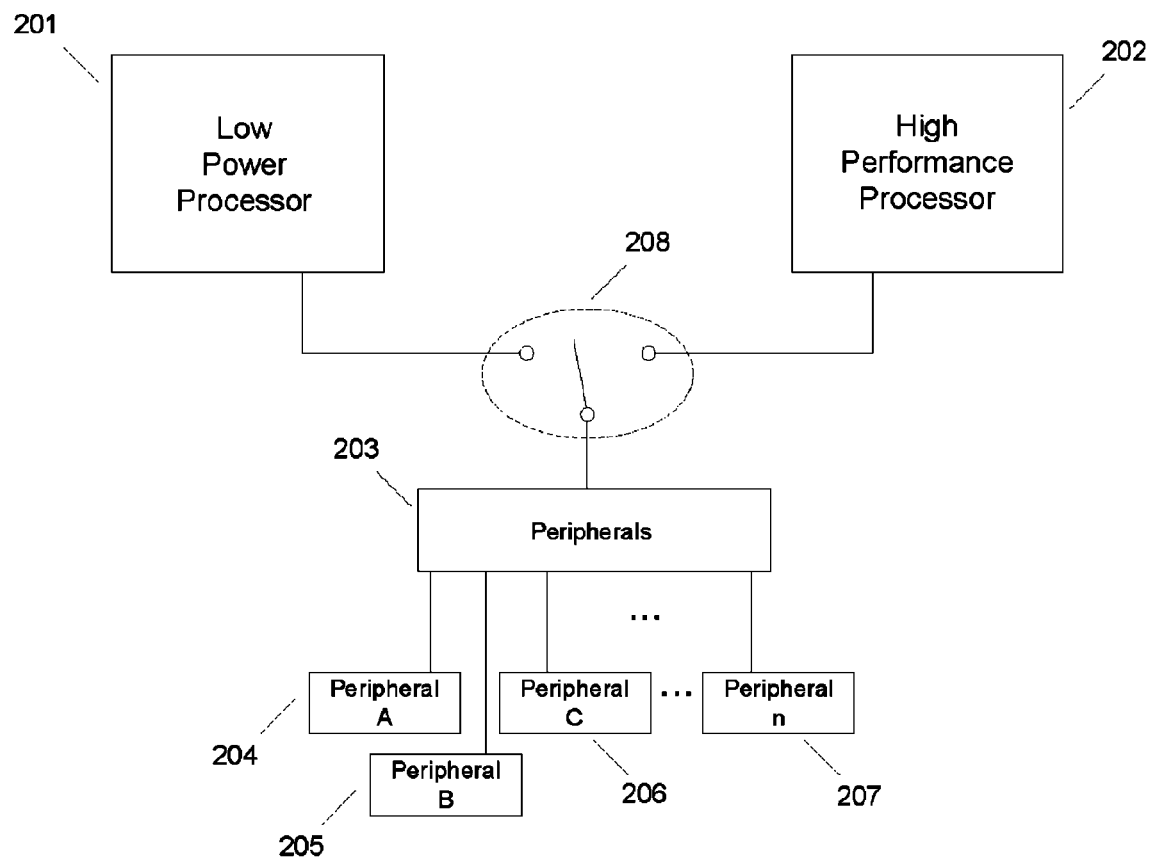
FIG. 2 illustrates an example of selection of a processor for performing a function in a hybrid computing device.

FIG. 2 illustrates an example of selection of a processor for performing a function in a hybrid computing device. In this example, a hybrid computing device 200 contains multiple processors. FIG. 2 illustrates two processors, a low power processor 201 and high performance processor 202, although any number of processors may be included. In this example, the low power processor 201 and the high performance processor 202 are connected to a switch 208. Based on the status of the switch 208, either of the low power processor 201 or the high performance processor 202 may control any number of peripheral devices. In this example, the processors (201, 202) may control any peripheral (e.g., peripheral A 204, peripheral B 205, peripheral C 206, peripheral n 207) via a peripheral driver 203. When high performance function is requested such that the power needed to perform the function is greater than a predetermined threshold, the high performance processor 202 may be selected for controlling the peripheral devices (204-207) to perform the function. In this case, the switch 208 may be positioned such that the high performance processor 202 controls the peripheral devices via the peripheral driver 203. Alternatively, when a low power function is requested such that the power needed to perform the function is less than a predetermined threshold, the low power processor 201 may be selected to control the peripheral devices (204-207). In this case, the switch 208 switches to an alternate position such that the low power processor 201 controls the peripheral devices (204-207) via the peripheral driver 203 to control the peripheral devices (204-207) in performing the requested function. Also, less power may be consumed when the low power processor 201 controls the peripheral devices. This may conserve power and may prolong battery life.

Figure 3:
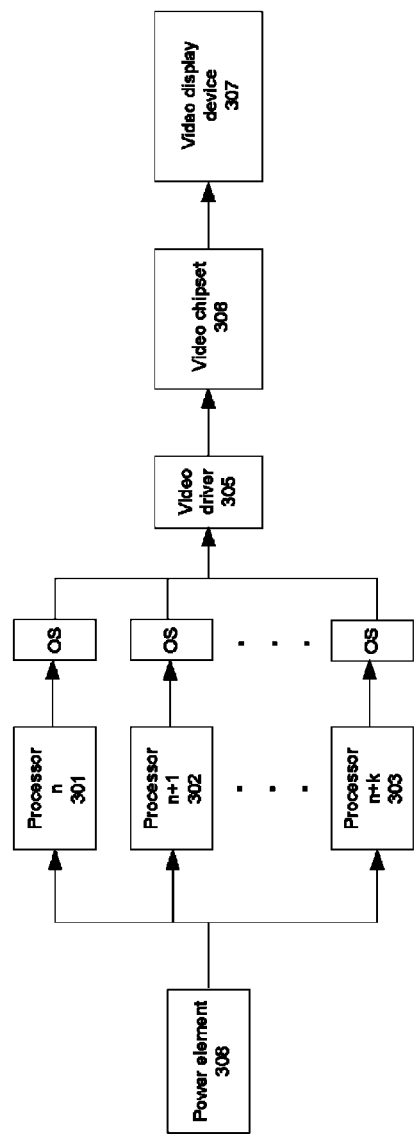
FIG. 3 illustrates an example of a hybrid computing device or apparatus containing multiple processors for controlling a display device.

In one example, the peripheral devices include a display device. Also any number of processors may be used with any number of corresponding operating systems to control the display device. FIG. 3 illustrates an example of a hybrid computing device or apparatus containing multiple processors for controlling a display device. In this example, a power element 308 powers any number of processors. As illustrated in FIG. 3, k processors are provided in the hybrid computing device (processor n 301, processor n+1 302, processor n+k 303). Each of the processors has a corresponding operating system (OS). The power element 308 may select a processor from the multiple processors based on a desired or requested function. For example, each of the processors (301-303) may function at a different power level such that processor 301 may be a low power processor that is capable of performing functions of a power rating that is less than a first predetermined level, processor 302 may be a middle-range processor that is capable of performing functions of a power rating that is greater than the first predetermined level but less than a second predetermined level, the second predetermined level being higher than the first predetermined level. Also, processor 303 may be a high capacity or high performance processor that is capable of performing functions of a power rating that is greater than the second predetermined level. Although three processors are described, any number of processors may be used with any power rating.

The power element 308 may select a processor (301, 302, or 303) based on a power rating of a requested function. For example, a requested function with a high power rating (e.g., a power rating greater than the second predetermined may result in the power element 308 powering processor 303 (i.e., the high performance processor) to control the peripheral device (i.e., display device, in this example). If the requested function has a low power rating (e.g., less than or equal to the first predetermined level), a low power processor (e.g., processor 301) may be selected and powered by the power element 308 to control the peripheral device (i.e., display device). In this example, the low power processor consumes less power than the high performance or high capacity processor. Therefore, use of the low power processor (e.g., processor 301) may conserve power as compared to use of the high capacity or high performance processor (e.g., processor 303). Likewise, use of the middle-range processor (e.g., processor 302) may consume an amount of power that is intermediate between power used in operating the low power processor (e.g., processor 301) and the power used in operating the high power or high capacity processor (e.g., processor 303). Thus, in this example, a processor may be selected for controlling a peripheral device (e.g., display device) based on the power rating of a desired function such that a low power processor is selected if the low power processor is capable of controlling the peripheral device(s) to perform the function. Otherwise (i.e., if the low power processor is not capable of performing a desired function, for example, due to power limitations), a higher power processor is selected to control the peripheral devices to perform the requested function.

Also illustrated in FIG. 3, the selected processor may control the peripheral device. In this case, the peripheral device includes a video display device 307. The selected processor controls the video display device 307 via a video driver 305 and a video chipset 306. In one example, a user interface may be presented on the video display device 307 such that a user may receive information from the hybrid computing device or may input information into the hybrid computing device. Also, the user interface displayed on the video display device 307 may correspond to a selected processor that controls the video display device 307. For example, if the low power processor (e.g., processor 301) is selected to control the video display device 307 to provide a user interface corresponding to a requested low power function, a user interface corresponding to the low power function may be presented on the video display device 307. Alternatively or additionally, when a high capacity function is requested, a different processor such as a high capacity processor (e.g., processor 303) may be selected for controlling the video display device 307 (via the video driver 305 and/or video chipset 306). In this case, a user interface corresponding to the high capacity processor may be displayed on the video display device 307.

In another example, the user interface is displayed on the video display device 307 in a first instantiation when one processor controls the display device and is displayed on the video display device 307 in a second instantiation when another processor controls the display device. Thus, when control of peripheral devices (such as the video display device 307) switches from a first processor to a second processor, the displayed user interface also switches accordingly from a first instantiation to a second instantiation. In addition, the change of the user interface from the first instantiation to the second instantiation may be imperceptible to the user such that the change from the first instantiation to the second instantiation of the user interface is not visibly perceptible on the video display device 307.

For example, a user interface may be displayed in a first instantiation while a low power processor controls or powers a display device. Responsive to the receipt of a request for a high power or high performance function, control of the peripheral devices (e.g., display device) may switch from the low power processor to a high capacity or high performance processor. When control switches to the high performance processor, the user interface may be displayed in a second instantiation corresponding to the high performance processor. However, also in this example, the second instantiation of the user interface is substantially similar to the user interface in the first instantiation. Alternatively or additionally, the second instantiation of the user interface may be different from the first instantiation of the user interface but of the same type or the same class as the first instantiation.

In yet another example, the user interface smoothly transitions from the first instantiation to the second instantiation when control switches or transfers from one processor to another. In this example, the transition is smooth such that any jarring effects of the transition are not present or not substantially perceptible. In one example, changing or switching from one instantiation of the user interface to another instantiation of the user interface may be accomplished over a single frame or a limited number of frames (e.g., 2 frames, 3 frames, 4 frames, 5 frames, 10 frames, more than 10 frames, etc.).

Figure 4:
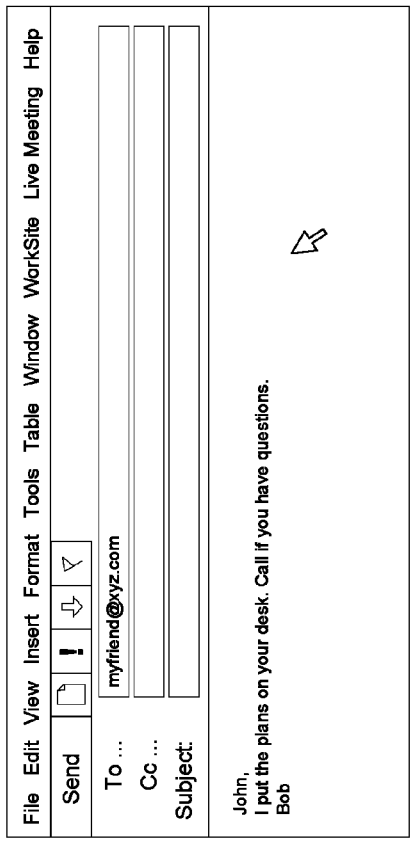
FIG. 4 illustrates an example of an instantiation of a user interface on a display.

FIG. 4 illustrates an example of an instantiation of a user interface on a display. In this example, an e-mail application is displayed. The user interface provides an e-mail message interface in which a user may enter text to an e-mail message. The e-mail message may be composed by the user and may be transmitted to a recipient of the message. In this example, a user inputs an e-mail address of a recipient of the message in one field of the user interface (401) and also inputs text into a portion of the user interface (402) for the body of the message. Also in this example, inputting text for composing an e-mail message may use a certain amount of computing power from the computing device. The amount of power used in composing an e-mail message is less than a predetermined amount of power. Therefore, in this example, a low power processor may be selected to control or power peripheral devices (e.g., a display device) during the composing of the message.

Figure 5:
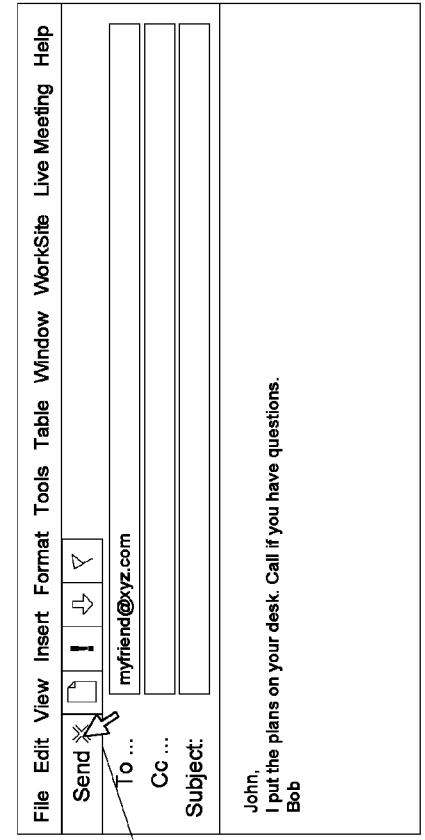
FIG. 5 illustrates an example of sending an e-mail message in a hybrid computing device.

FIG. 5 illustrates an example of sending an e-mail message in a hybrid computing device. In this example, a user has completed composing an e-mail message by entering text into a corresponding portion of a user interface. In this case, the user has entered text for the body of the e-mail message into the corresponding portion of the user interface 502. The user further wishes to send the e-mail message to the intended recipient. To accomplish this task in this example, the user selects a second portion of the user interface corresponding to sending the e-mal message. As illustrated in FIG. 5, the user positions a cursor 501 over a send button 503 and selects the send button 503. Selection of the send button 503 causes the email message to be sent to the intended recipient.

In this example, requesting the sending of the e-mail message may consume a level of power that is greater than a predetermined amount. For example, if a predetermined threshold is determined in which consumption of power that is less than the predetermine threshold is considered a low power function whereas consumption of power that is greater than the predetermined threshold is considered a high power function, then if the amount of power consumed in transmitting the e-mail message is greater than the predetermined threshold level, the hybrid computing device may switch the control of the peripheral devices (e.g., the display device) from a low power processor to a high power processor. The high power processor may be capable of controlling the peripheral devices to transmit the e-mail message in this example but may also use a greater amount of power in accomplishing the task as compared to the low power processor. Alternatively, the low power processor may be unable to transmit the e-mail message if the amount of power consumed in transmitting the e-mail message exceeds the capabilities of the low power processor.

Thus, in this example, when the user selects the send button 503, the hybrid computing device determines that the power level of the requested function (i.e., transmitting the e-mail message to the intended recipient) is greater than the predetermined threshold and, responsive to the determination, may switch control of the peripheral devices to a high power processor. In this example, a switch may be provided in the hybrid computing device for switching control from one processor to another processor. Hence, the hybrid device contains at least two processors that may be separate and distinct from one another. Also, each of the processors may have different functionality and/or power consumption levels.

When a low power function is requested, a low power processor may be selected to control the peripheral devices such as the display device for displaying the user interface. When a high power function is requested (e.g., sending or transmitting an e-mail message), control switches from the low power processor to a high power processor.

Figure 6:
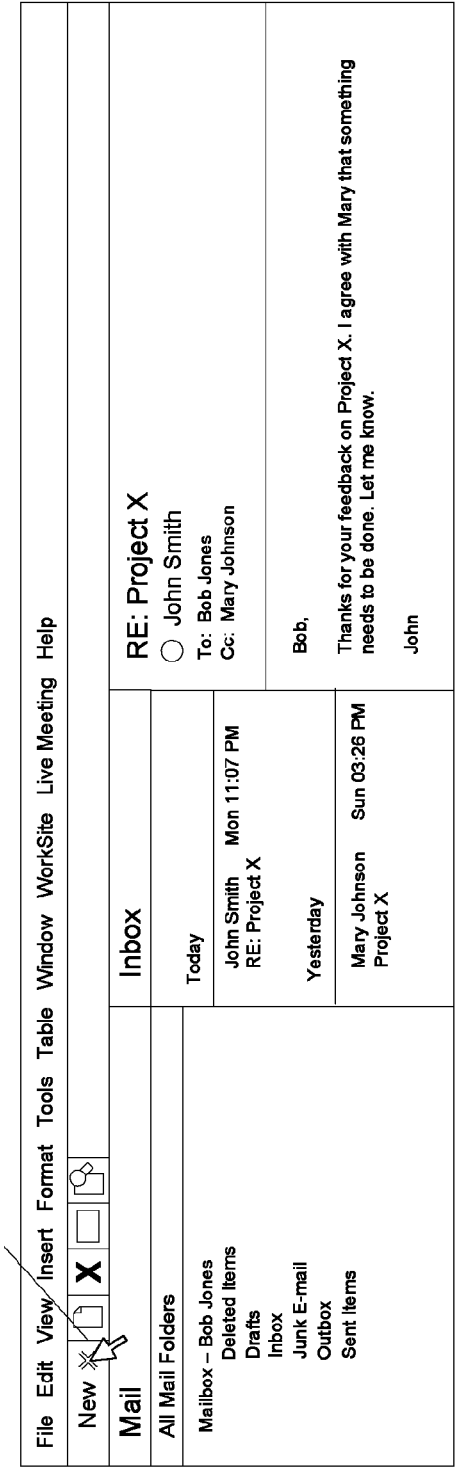
FIG. 6 illustrates another user interface displayed on a display device after selection of a command to transmit the e-mail message.

FIG. 6 illustrates another user interface displayed on a display device after selection of a command to transmit the e-mail message. In this case, control of the display device is provided by a high power processor (e.g., may be switched from a low power processor) and a user interface is displayed as determined or controlled by the high power processor. As FIG. 6 illustrates, the user interface corresponds to the e-mail application such that no substantial visible indication is present to indicate that a switch in control has been made. In this example, a user may be unaware that control of the display device has switched from a low power processor to a high power processor based on the display of the user interfaces.

In one example, after the e-mail message has been successfully transmitted, control of the peripheral devices such as the display device may switch back to the low power processor. For example, less power may be consumed by the low power processor and switching back to control by the low power processor may conserve energy as compared to controlling the display device with the high power processor. Hence, if control of the display device and the display of the user interface switches back to the low power processor, then FIG. 6 may illustrate a user interface as displayed via control by the low power processor.

Alternatively, control may remain with the high power processor until a low power function request is received at the system. In this case, the user interface illustrated in FIG. 6 may be provided via the high power processor. Thus, the instantiation of the user interface may be different based on which processor is controlling the peripheral devices. The determination of which processor controls the peripheral devices may, in turn, be based on the type of function requested (e.g., power level of the requested function or the requested type of function).

In the example in which the high power processor controls the display device for displaying a corresponding user interface as illustrated in FIG. 6, a user may select a command to compose a new e-mail message (601). In this case, the user may select a "New" button 602 to being composing a new e-mail message to an e-mail message recipient of choice.

Figure 7:
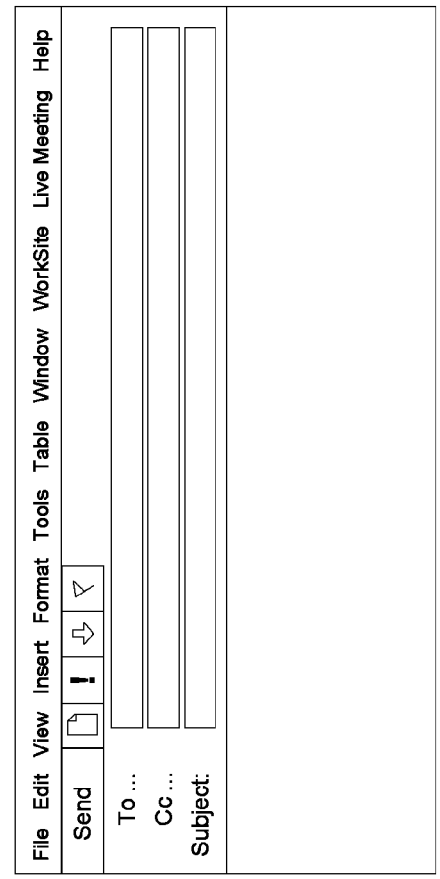
FIG. 7 illustrates a display of a user interface for composing an e-mail message in a hybrid computing device.

FIG. 7 illustrates a display of a user interface for composing an e-mail message in a hybrid computing device. In this example, the hybrid computing device may have been controlled by a high power processor. The user inputs a command to compose a new e-mail message. Responsive to the command, a new user interface (as illustrated in FIG. 7) may be displayed and control of the display device may switch from the high power processor to a lower power processor. In the case of two processors, control may switch from the higher power processor to the lower power processor. In the case of more than two processors, control may switch from one processor to any processor of lower power. In one example, control switches from a first (high power) processor to the next lower power processor. In another example, control switches from one processor to a lower power processor that consumes less power than the first processor and for which no lower processor is capable of powering the display device and providing the requested functionality. Thus, in this example, the lowest power processor capable of controlling the display device and providing the requested function. Also, the user interface displayed before and after the switch of processor control may be substantially the same. Alternatively, the user interfaces may be of the same type or from the same application. The transition from one user interface to another user interface during switching of processor control is smooth such that a user may not be visibly aware of the switch from one processor to another.

During the display of the user interface in FIG. 7, the hybrid computing device may determine that inputting of text for an e-mail message does not need large amounts of power. Therefore, control of the display device may switch from the high power processor to the low processor, in another example, control switches to the low power processor which uses less energy than the high power processor.

Figure 8:
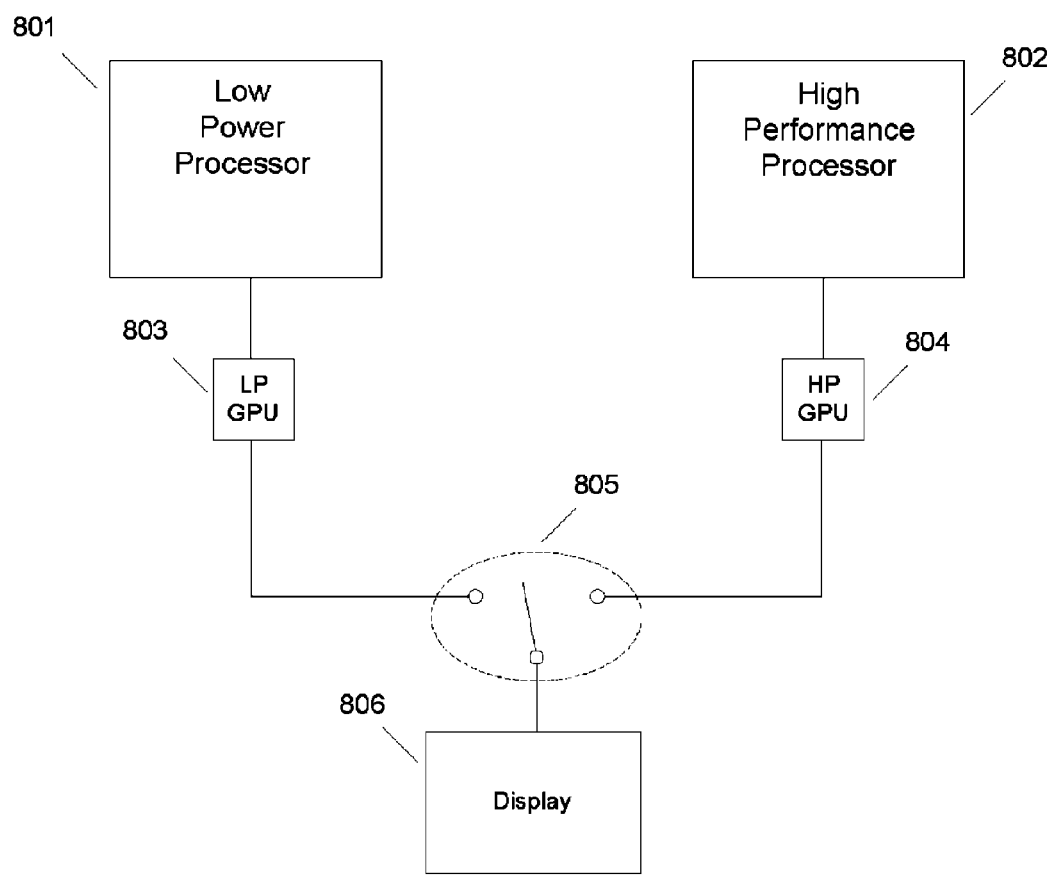
FIG. 8 is a block diagram illustrating an example of a hybrid computing device.

FIG. 8 is a block diagram illustrating another example of a hybrid computing device. In this example, the hybrid computing device may include at least two processors. Also in this example, the computing device includes a low power processor 801 and a high performance processor 802. Each of the processors may control a display 806 via a switch 805. Also, each of the processors may be associated with a corresponding graphics processor unit (GPU). In this example, the low power processor has a corresponding low power GPU 803 and the high performance processor 802 has a corresponding high power CPU 804. Depending on the function being performed, a corresponding processor may control the display device and may further provide a user interface on the display 806.

For example, if a low power or low capacity function is being performed, the low power processor 801 may function via the LP GPU 803 to control the display 806 and to provide a corresponding user interface on the display 806. If a new request for a different function is received and the requested different function is a high power or high capacity function, the switch 805 may toggle such that control of the display 806 is provided by the high performance processor 802 via the corresponding HP CPU 804. In this case, the high performance processor 802 may use more power than the low power processor 801 in accomplishing the requested task. Alternatively, the low power processor 801 may be incapable of performing the requested high power function based on a variety of reasons which may include power limitations of the low power processor 801. In this case, the switch 805 may toggle to permit the high performance processor 802 to control peripheral devices such as the display 806 and for providing a corresponding user interface.

In yet another example, the user interface provided on the display 806 via the low power processor 801 may be either substantially similar to a user interface provided on the display 806 via the high performance processor 802 or may be of substantially the same type or provided by the same application. When control of the peripheral devices (e.g., the display 806) switches from one of the processors to another of the processors, the displayed user interface may switch from one instantiation to another. However, the transition between the two instantiations of the user interface may be smooth and not visibly noticeable by a user.

Figure 9:
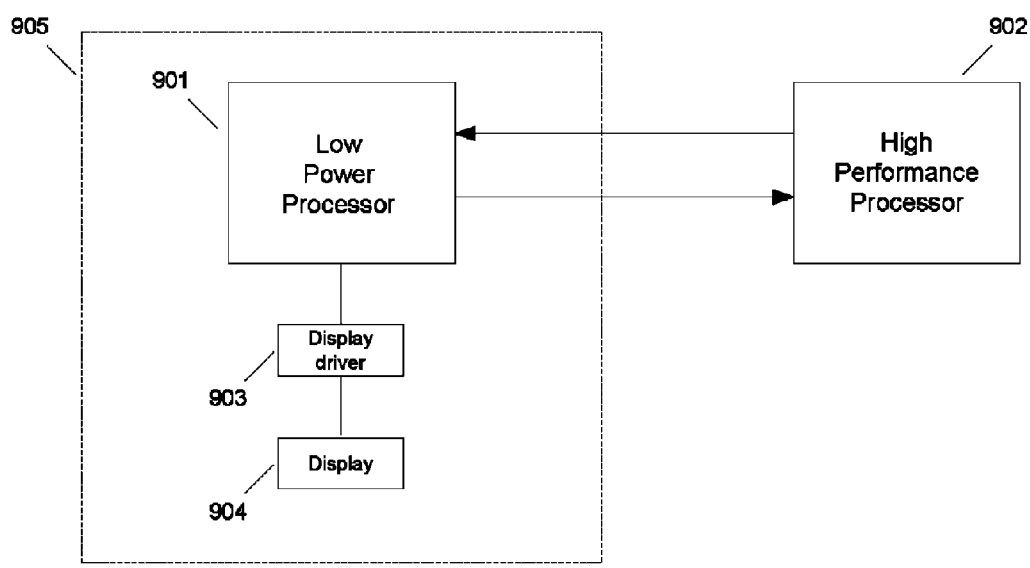
FIG. 9 is a block diagram illustrating another example of a hybrid computing device and control of a peripheral device (e.g., display device) by at least one processor in a plurality of processors of the computing device.

FIG. 9 is a block diagram illustrating another example of a hybrid computing device and control of a peripheral device (e.g., display device) by at least one processor in a plurality of processors of the computing device. In this example, a low power processor 902 may control or power a display 904 via a display driver 903. The low power processor 902 may further provide a corresponding user interface to be displayed on the display 904. The user interface may be associated with the low power function being performed by the hybrid computing device.

When a request for a high power function is received, control may switch from the low power processor 901 to a high performance processor 902. However, in this example, the high performance processor 902 does not communicate directly with the peripheral device (e.g., display 904). Instead, the high performance processor 902 communicates with and controls the low power processor 901 which may, in turn, control or power the peripheral device(s) (e.g., the display 904). The low power processor 901 may thus communicate and control the display 904 on behalf of the high performance processor 902. Hence, the low power processor 901 and the display 904 may form a subsystem 905 within the hybrid computing device and the high performance processor 902 may control this subsystem. As illustrated in the example of FIG. 9, the high performance processor 902 controls or communicates with the low power processor 901 of the subsystem 905 to control the display 904 via the display driver 903.

In this case, the high performance processor 902 may provide a user interface for display on the display 904. The high performance processor 902 sends a command to the low power processor 901 which may include parameters for generating a user interface corresponding to an application. The low power processor 901 may further transmit a command to the display 904 via the display driver 903 to display a user interface corresponding to the user interface information from the high performance processor 902. Alternatively or additionally, if a requested function is a low power function, the low power processor 901 may control or power the display 904 and provide a corresponding user interface. In this case, the high performance processor 902 may power off or, alternatively, enter a lower power mode such as asleep mode.

Figure 10:
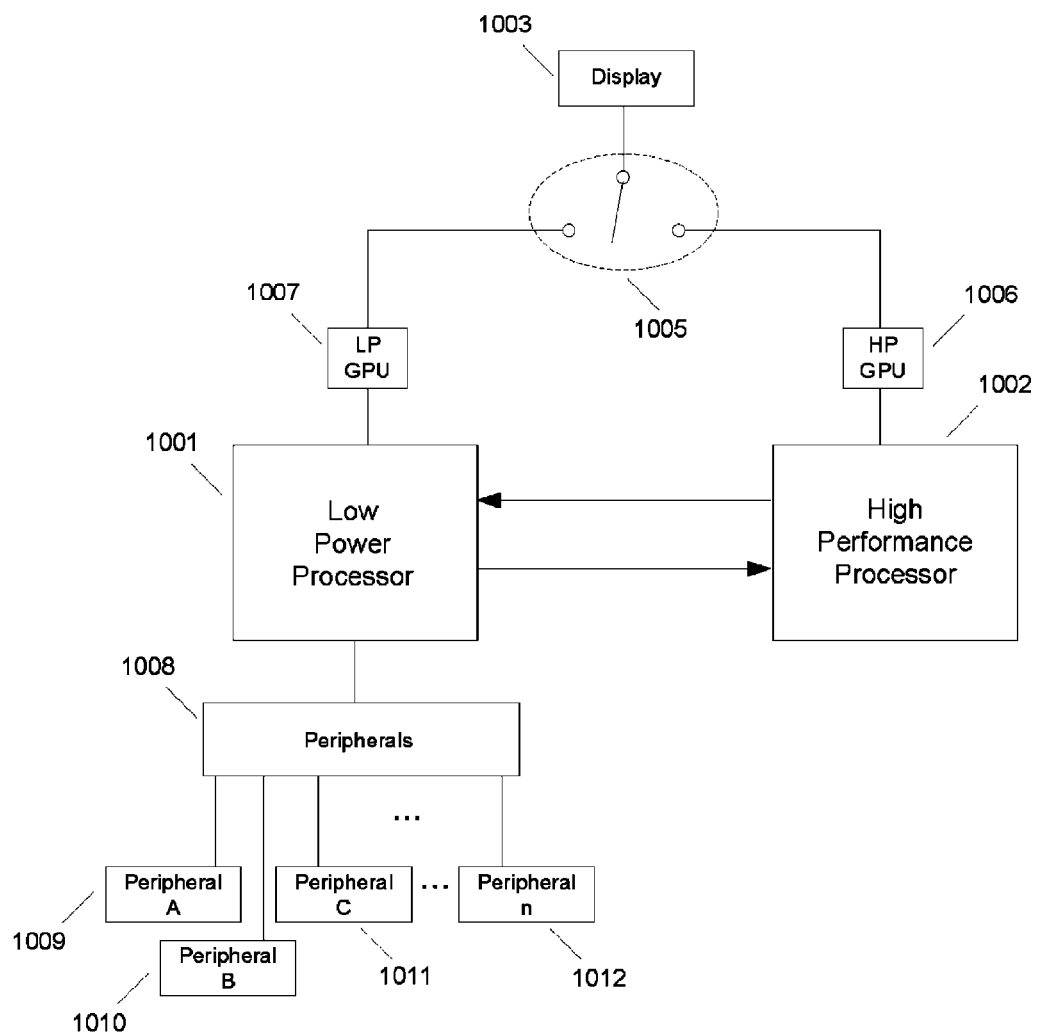
FIG. 10 is a block diagram illustrating another example of a hybrid computing device.

FIG. 10 is a block diagram illustrating another example of a hybrid computing device. In this example, the hybrid computing device 1000 contains a low power processor 1001 and a high performance processor 1002. Although two processors are illustrated in FIG. 10, any number of processors may be included in any configuration. Also, any of the processors may function at any designated power level.

The low power processor 1001 may control any number of peripheral devices (e.g., peripheral A 1009, peripheral B 1010, peripheral C 1011, peripheral n 1012) for performing a desired function. The peripheral devices may be of any type. For example, the peripheral devices may include a disc drive, a GPS unit, a 3G Wireless card, DVD drive, WiFi card, audio system, etc. These are merely examples as any peripheral device may be included. In addition, the low power processor may be connected to a display via a LP GPU 1007 and may further provide a user interface corresponding to a function being performed. The user interface provided by the low power processor 1001 may be displayed on the display 1003 for a user. For example, a requested function may include a function performed on a peripheral device being controlled by the low power processor 1001. In this example, the requested function may be a low power function of which the low power processor 1001 is capable of controlling. The low power processor 1001 may further provide a user interface via the LP GPU 1007 for display on the display 1003. The user interface from the low power processor may correspond to a function being performed at a peripheral device. For example, a user may input commands or data via the user interface on the display 1003. Based on the commands or data input by the user, the peripheral device(s) may perform a requested or desired function in a specified manner.

Also in this example, the hybrid computing device 1000 may further include a high performance processor 1002. The high performance processor 1002 may be a separate entity from the low power processor 1001 and may control or power the peripheral devices (1009-1012) via the low power processor 1001. As FIG. 10 illustrates, the high performance processor communicates with the low power processor 1001. Also in this example, the high performance processor does not communicate directly with the peripheral devices (1009-1012). Rather, the high performance processor 1002 communicates with and/or controls the low power process 1001 which, in turn, communicates with and/or controls the peripheral devices (1009-1012). Thus, communications by the low power processor 1001 with the peripheral devices (1009-1012), in this example, are performed on behalf of the high performance processor 1002.

Also, the high performance processor 1002 may control or power a display 1003. As illustrated in the example of FIG. 10, the high performance processor 1002 may drive or control the display 1003 via a high power graphics processing unit (HP GPU 1006). Also, a switch 1005 may control which processor communicates with the display 1003. For example, when the low power processor 1001 controls the display 1003, the switch 1005 may be set to permit communication between the low power processor 1001 and the display 1003. In this case, the high performance processor 1002 does not communicate with the display 1003. Conversely, when the high performance processor 1002 controls the display 1003, the switch 1005 may be set to permit communication between the high performance processor 1002 and the display 1003. In this case, the low power processor 1001 does not communicate with the display 1003.

Which processor (low power processor 1001 or high performance processor 1002) communicates with the display or the peripheral devices (1009-1012) may vary depending on a function being performed. For example, if a user requests a function to be performed that needs a certain level of power that exceeds a predetermined amount, for example, the low power processor may be incapable of providing the requested function if the low power processor 1001 is capable of providing functions that do not exceed the predetermined amount of power. In this case, control of the hybrid computing device or the peripheral devices (1009-1012) may switch to the high performance processor 1002 from the low power processor 1001.

Also, control of the display 1003 may switch between the low power processor 1001 and the high performance processor 1002. For example, if a high capacity or high power function is being performed, the high performance processor may control the low power processor 1001 to control the peripheral devices (1009-1012) as described. In this case, the low power processor 1001 and the peripheral devices (1009-1012) forms a subsystem which is controlled by the high performance processor 1002. Also in this example, the display 1003 may be controlled by the high performance processor 1002 via the HP CPU 1006 separate from the subsystem (i.e., the low power processor 1001, peripheral driver 1008 and peripheral devices 1009-1012). Hence, if a high power function is being performed (e.g., via the peripheral devices), the display may be controlled by the high performance processor. Also, the high performance processor 1002 may provide a corresponding user interface for display on the display device 1003 where the user interface corresponds to the high power function being performed.

Further in this example, if a new function is requested that is a low power function capable of being controlled by the low power processor, then control of the peripheral devices 1009-1012 via the peripheral driver 1008 may switch to the low power processor. In this case, the high performance processor 1002 may reduce power consumption. For example, the high performance processor 1002 may power off or may enter sleep mode. Also, the switch 1005 may change state to permit the low power processor 1001 to control the display 1003 (via the LP CPU 1007). The low power processor 1001 may provide a user interface for display on the display device 1003 that corresponds to the low power function being performed. Thus, in this example, the user interface being displayed on display 1003 may switch from the instantiation of the user interface from the high performance processor 1002 to another instantiation of the user interface from the low power processor 1001. The transition between the different instantiations of the user interface may be made without a substantial visual indication that a change has been made. Thus, the user may experience a smooth transition between the user interfaces without jarring effects.

In one example, the user interface provided with the high performance processor 1002 is substantially similar to the user interface provided with the low power processor 1001 such that a user may be unaware that a change has been made when control transitions from one of the processors to the other. In another example, the user interface provided with one of the processors corresponds to the same application as the user interface provided with the other of the processors. In this example, a user interface corresponding to the same application is displayed on the display 1003 before and after the transition from one processor to the other processor. Therefore, the user may be unaware that a change has been made.

Figure 11:
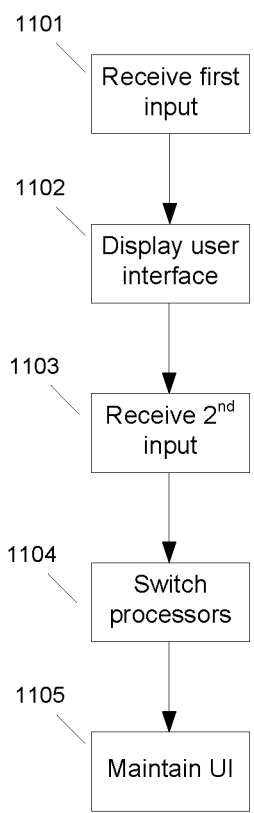
FIG. 11 is a flowchart illustrating an example of providing a user interface on a display.

FIG. 11 is a flowchart illustrating an example of providing a user interface on a display. In this example, a command or input is received from a user at a hybrid computing device (STEP 1101). The command may indicate a desired function to be performed by the hybrid computing device or peripheral devices connected to the hybrid computing device. For example, the user may request an operation that uses a level of power that is less than a predetermined amount. The hybrid computing device in this example includes multiple processors that may operate at different power levels. Also, the different processors may have certain levels of functionality which may further be proportional to each respective power level.

Based on the requested function, a corresponding processor may be selected for controlling and/or powering the peripheral devices connected to the hybrid computing device. Also, the selected processor may control a display device and may provide a corresponding user interface on the display (STEP 1102). The user interface may include any number of fields in which a user may input data. In one example, the requested function is a low power function that uses a level of power that is less than a predetermined amount. Based on the type of function and the corresponding level of power, a low power processor may be selected for controlling the peripheral devices and/or the display device. The low power processor thus controls the display device and provides an instantiation of a user interface on the display which corresponds to the requested function.

In STEP 1103, a second input may be received at the hybrid computing device. The second input may include a command for a second function that may be different from the first function. The second function may also use a different level of power as compared to the first function. For example, if the first function needed a low level of power (i.e., a level of power that is less than the predetermined level) and if the second function needs a high level of power such as a level of power that is greater than the predetermined level, then the previously selected processor (i.e., the processor selected to perform the first function) may be unable to perform the second function. For example, if the selected processor (i.e., low power processor, in this example) was selected to control the peripheral devices and/or display to perform the first function, control of the peripheral devices and/or the display may be switched to another processor to perform the second function (i.e., the high power function) (STEP 1104).

Switching control from one processor to another may be responsive to a type of function requested. For example, if a low power processor controls the peripheral devices and/or display to perform a low power function and a high power function request is received, then the low power processor may determine that the high power function may not be performed under the control of the low power processor. This determination may trigger a switch of control from the low power processor to a higher power processor (STEP 1104). Alternatively, a manual switch may be provided such that a user may manually switch from one processor to another, if desired.

When control of the peripheral devices switches from one processor to another, control of the display device may also switch and another instantiation of a user interface may be provided on the display device based on the other processor. For example, if a low power processor controls the peripheral devices and provides a user interface instantiation on the display corresponding to a function being performed and if a request for a high power function is received, control of the display device may switch from the low power processor to a high power processor. In one example, a switch is provided such that when a new requested function results in a switch of control from one processor to another, the switch changes state such that control of the display device switches from the one processor to the other. In another example, the second processor is in direct communication with the display device to provide another instant at on of the user interface. Also, the second processor does not communicate directly with the other peripheral devices. Rather, the first processor controls and communicates with the other peripheral devices on behalf of the high power processor such that the high power processor controls the other peripheral devices only through the low power processor. In this case, the first processor and the other peripheral devices form a subsystem that is collectively controlled by the second processor and the second processor does not directly communicate with or is not directly connected to the other peripheral devices.

As FIG. 11 demonstrates, changing control from one processor to another processor results in a change in the instantiation of the user interface on the display. In this example, the transition from one instantiation of the user interface to another instantiation of the user interface is smooth such that a user may be unaware that a change has occurred. For example, one instantiation of the user interface on one processor subsystem may result in a switch to a user interface presenting a same user interface and user interaction model while maintaining th look and feel of the user interface (STEP 1105). Hence, in this example, there may be no substantial visible indication that a switch of processor control has taken place.

Figure 12:
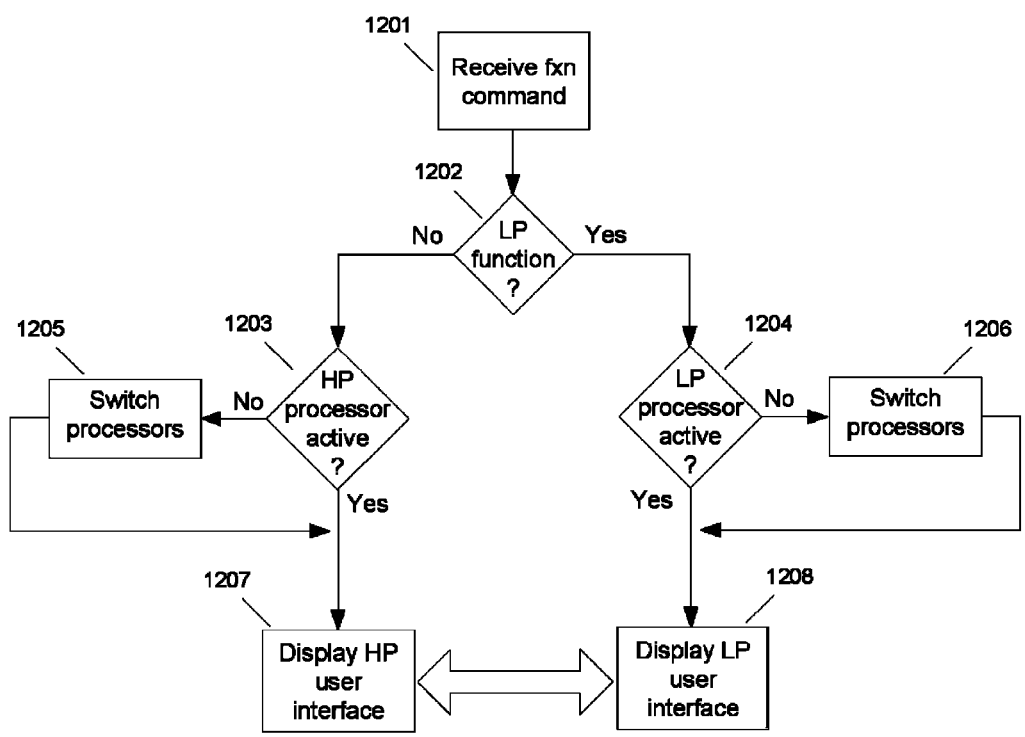
FIG. 12 is a flowchart illustrating another example of providing a user interface on a display.

FIG. 12 is a flowchart illustrating another example of providing a user interface on a display. In STEP 1201, a command for a function is received, for example, from a user. A determination is made as to the power level of the function. A function that uses a level of power that is less than a predetermined amount may be determined to be a low power function while a function that uses a level of power that is greater than the predetermined amount may be determined to be a high power function (STEP 1202). If the requested function is determined to be a low power function ("Yes" branch of STEP 1202), the processor currently controlling peripheral devices and/or a display is determined. An apparatus may include multiple processors such that any one or combination of the processors may be controlling peripheral devices and/or displays. The different processors may operate at different power levels such that one processor may use more power than another processor. Also, a processor using less power may have a more limited range of functions that the processor is capable of performing as compared to a processor using more power.

If a processor can use a maximum amount of power that is less than the predetermined amount, the processor may be determined to be a low power processor. If a processor can use a maximum amount of power that is greater than the predetermined amount, the processor may be determined to be a high power processor. There may be any number of processors at any different level (e.g., intermediate levels) of power usage. Different levels of power usage may be assigned different ratings, if desired.

In this example, if the function requested is a low power function ("Yes" branch of STEP 1202) and the low power processor is active ("Yes" branch of STEP 1204), then the low power processor may display a user interface corresponding to the requested function (STEP 1208). Alternatively, if the low power processor is not active (for example, a high power processor may be active) ("No" branch of STEP 1204), then control of peripheral devices and/or the display may switch to the low power processor (STEP 1206). The low power processor may display a corresponding user interface on the display (STEP 1208).

If the requested function is a high power function such that the power usage to perform the high power function is greater than the predetermined amount ("No" branch of STEP 1202), then a determination is made as to which processor is currently active (STEP 1203). If a high power processor is currently active such that the high power processor is capable of performing the requested high power function ("Yes" branch of STEP 1203), then the high power processor may display an instantiation of the user interface corresponding to the requested function (STEP 1207). Alternatively, if the high power processor is not currently active and a low power processor is active ("No" branch of STEP 1203), then the currently active low power processor may be incapable of performing the requested high power function. In this case, control of the peripheral devices and/or control may switch from the low power processor to a high power processor (STEP 1205) that is capable of performing the requested high power function. The high power processor may display an instantiation of the corresponding user interface on a display (STEP 1207).

Also, if more than two processors are used at different power levels, then a determination may be made if a lower processor may be used to conserve power. For example, if three processors are used with a first processor operating at a low power level that is less than a first predetermined level, a second processor operating at a middle power level that is greater than the first predetermined level but less than a second predetermined level, and a third processor operating at a high power level that is greater than the second predetermined level. In this case, the third (high power) processor may be currently active when a low power function is requested. The low power function may use an amount of power that is less than the first predetermined level. In this case, a determination may be made that both the first and the second processors may perform the requested function. However, a further determination may be made that the processor with the lowest power level capable of performing the function is the first processor. Thus, in this example, the first processor (and not the second processor) may be selected to control the peripheral devices and/or display to perform the function and provide a corresponding user interface on a display.

The user interface may be displayed when a one processor is currently active. The user interface may be displayed also when a second processor is active (i.e., controlling peripheral devices to perform a requested function). When a switch occurs between processors, the user interface may also switch from a first processor to a second processor for controlling the peripheral devices to perform a function. In this example, the user may be displayed via a first processor subsystem when a switch is made from the first processor subsystem to a second processor subsystem. The user interface presented on the display may thus also switch to the second processor subsystem, however, the switch in the user interface is made with a smooth transition such that the user may be unaware or may not realize a switch has taken place. For example, the second processor subsystem may provide a second user interface that is substantially similar to the user interface in substantially the same location on the display as compared to the user interface from the first processor subsystem. Alternatively or additionally, the second processor subsystem may provide a second user interface corresponding to a same application as the application associated with the first user interface.

In one example, a non-obstructive visual experience is provided on both sides such that the design and the transition itself is non-jarring. For example, the switch between the instantiations of the user interface may be provided over a single frame or a small number of frames (e.g., 2 frames, 3 frames, 4 frames, 5 frames, etc.). For example, a less capable processor subsystem may hand off execution to a more capable processor subsystem without the user being aware the switch has taken place. Hence, in this example, a perception of lack of modality and an improved user experience is provided. In another example, a less capable processor subsystem is used in favor of reduced electrical power consumption but the user implicitly invokes a process requiring the availability of capability not found on that less capable processor subsystem (but within the capabilities of a more capable processor subsystem). A switch may be performed between the processor subsystems with the corresponding switch between instantiations of the user interface being imperceptible to the user.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A system comprising at least one computing device and at least one software component that are together configured for switching control of a peripheral, based on a power requirement corresponding to a function of the peripheral, between various processors of a plurality of processors that each have power-consumption characteristics that differ from other processors of the plurality of processors, where the each of the plurality of processors controlling the peripheral results in excluding all others of the plurality of processors from simultaneously and separately controlling the peripheral, and where the switching comprises identifying the power requirement corresponding to the function of the peripheral, and selecting a processor of the plurality of processors in response to the power requirement.

2. The system of claim 1 where the power-consumption characteristics include a maximum level of power consumption of at least one of the plurality of processors.

3. The system of claim 1 where the power requirement corresponds to a particular function.

4. The system of claim 1 further comprising detecting that the power requirement of the particular function has changed and switching control of the peripheral based on a new detected power requirement.

5. The system of claim 1 where a user of the computing device is unaware of the switching taking place.

6. The system of claim 1 where one of the plurality of processors is configured for directly controlling the peripheral, and where all others of the plurality of processors are configured for indirectly controlling the peripheral via the one of the plurality of processors.

7. The system of claim 1 where the computing device is configured for enabling a user to control the switching.

8. A method performed on a computing device, the method comprising switching control of a peripheral, based on a power requirement corresponding to a function of the peripheral, between various ones of a plurality of processors that each have power-consumption characteristics that differ from others of the plurality of processors, where the each of the plurality of processors controlling the peripheral results in excluding all others of the plurality of processors from simultaneously and separately controlling the peripheral, and where the switching comprises identifying the power requirement corresponding to the function of the peripheral, and selecting a processor of the plurality of processors in response to the power requirement.

9. The method of claim 8 where the power-consumption characteristics include a maximum level of power consumption of at least one of the plurality of processors.

10. The method of claim 8 where the power requirement corresponds to a particular function.

11. The method of claim 8 where a power-consumption characteristic of the selected processor corresponds to the power requirement.

12. The method of claim 8 where a user of the computing device is unaware of the switching taking place.

13. The method of claim 8 where one of the plurality of processors is configured for directly controlling the peripheral, and where all others of the plurality of processors are configured for indirectly controlling the peripheral via the one of the plurality of processors.

14. The method of claim 8 where the computing device is configured for enabling a user to control the switching.

15. At least one computer storage device storing computer-executable instructions that, when executed by at least one computing device, cause the at least one computing device to perform actions comprising switching control of a peripheral, based on a power requirement corresponding to a function of the peripheral, between various ones of a plurality of processors that each have power-consumption characteristics that differ from others of the plurality of processors, where the each of the plurality of processors controlling the peripheral results in excluding all others of the plurality of processors from simultaneously and separately controlling the peripheral, and where the switching comprises identifying the power requirement corresponding to the function of the peripheral, and selecting a processor of the plurality of processors in response to the power requirement.

16. The at least one computer storage device of claim 15 where the power-consumption characteristics include a maximum level of power consumption of at least one of the plurality of processors.

17. The at least one computer storage device of claim 15 where the power requirement corresponds to a particular function.

18. The at least one computer storage device of claim 15 where a power-consumption characteristic of the selected processor corresponds to the power requirement.

19. The at least one computer storage device of claim 15 where a user of the computing device is unaware of the switching taking place.

20. The at least one computer storage device of claim 15 where one of the plurality of processors is configured for directly controlling the peripheral, and where all others of the plurality of processors are configured for indirectly controlling the peripheral via the one of the plurality of processors.

* * * * *